United States Patent Office 3,413,023
Patented Nov. 26, 1968

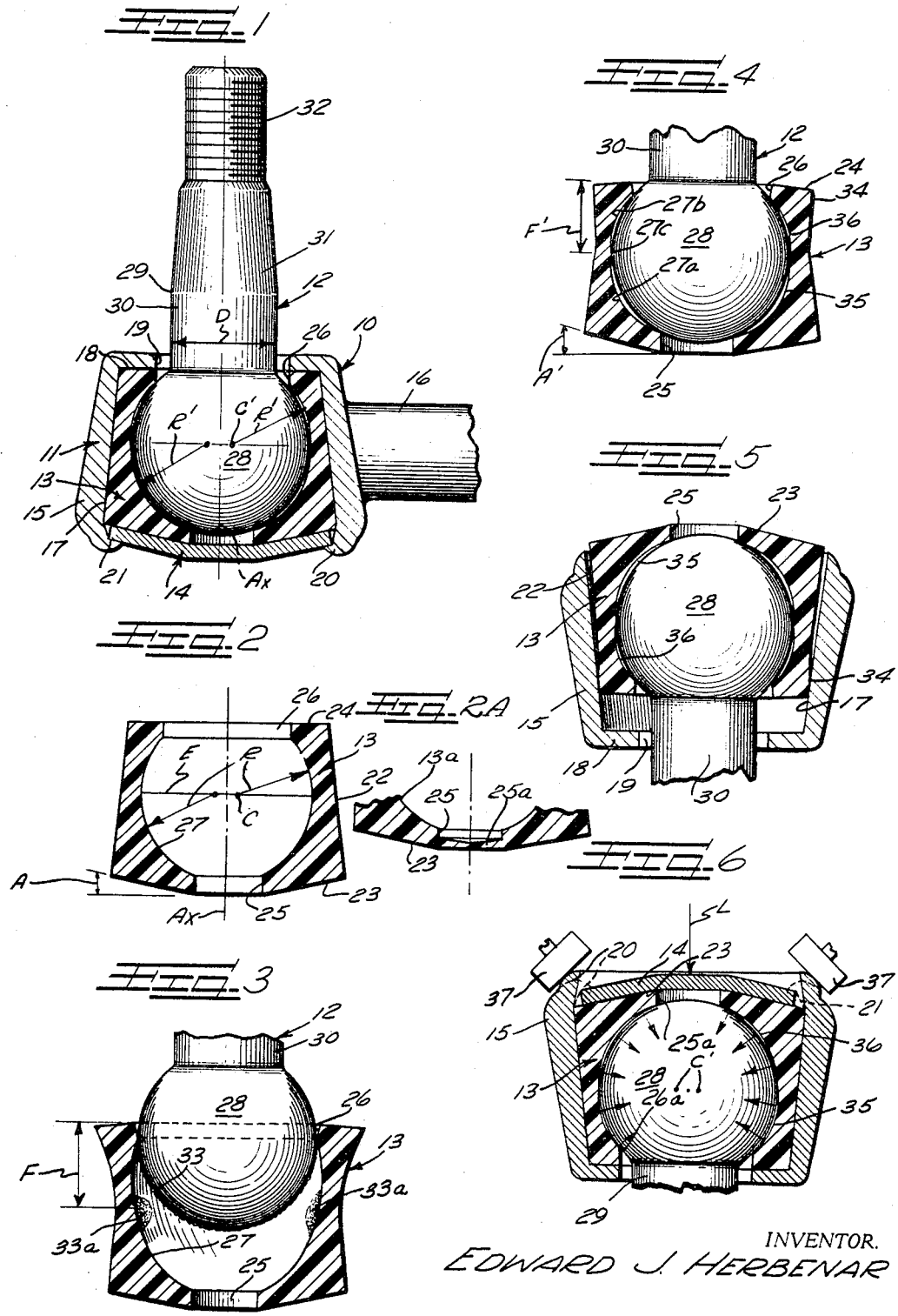

3,413,023
PRELOAD-CAPSULE JOINT
Edward J. Herbenar, Detroit, Mich., assignor to
TRW Inc., a corporation of Ohio
Filed Apr. 26, 1965, Ser. No. 450,616
7 Claims. (Cl. 287—87)

ABSTRACT OF THE DISCLOSURE

Ball and socket joints for automotive wheel suspensions and steering linkages having the ball member enveloped in a preformed high density linear ethylene copolymer plastic bearing which, in turn, is enveloped by a rigid socket housing. The bearing is stretched by the ball member and compressed by the socket member to provide force vectors generally normal to the surface of the ball member and effective to release energy for taking up wear developed during use of the joint. The bearing has apertures at opposite ends and the ball has loaded zones of engagement with the bearing adjacent each aperture and at the equator of the bearing wall. Annular pockets are provided between these loaded zones and lubricant is trapped in these pockets.

---

This invention relates to joint constructions, particularly ball joints for automotive steering linkages and wheel suspensions, wherein the joint components are firmly held for relative movements by a preformed, preloaded, high density material having some degree of elasticity and compressibility and an inherent memory to recapture its preformed shape by release of energy from residual compressive stresses retained therein to accommodate size variations and take up wear of the joint components without diminishing the firm support for the components.

Specifically this invention deals with a ball joint wherein the ball member is substantially completely enveloped by a preformed high density linear ethylene copolymer plastic block which in turn is substantially completely surrounded by a rigid socket coacting with the ball member to preload the block and create therein residual stresses having force vectors generally normal to the ball member which are released for use in maintaining good solid bearing support for the joint components.

While the principles of this invention are generally applicable to many different forms of joint constructions and to bearings in general, the invention will hereinafter be specifically described as embodied in ball and socket joints for automotive steering linkages which is the preferred embodiment of the invention.

According to this invention there is provided a permanently lubricated ball and socket joint accommodating boundary layer lubrication throughout the complex rotary and oscillating movements of the ball member and having residual compressive stresses providing force vectors substantially normal to the spherical ball surface and enveloping substantially the entire ball member to take up wear, dampen out vibrations, and maintain fixed tilting centers for the ball member. The joints of this invention include a preformed high density bearing block which is sufficiently deformable to stretch and receive the ball end of a ball stud to substantially completely envelop the entire ball end and which has some degree of compressibility so that when it is preloaded in a completely enveloping rigid casing or socket it will retain compressive stresses that store energy for release to take up wear between the parts and to accommodate irregularities of the parts.

The preformed block preferably has a circular torus shaped ball receiving interior of less diameter than the ball to be received therein so that the block is stretched and prestressed by the ball even before the block is seated in the housing of the joint. The material of the block has an elastic memory continually attempting to reclaim its original preform shape and this capacity causes the block to maintain a tight socket for the ball. In addition the housing of the joint completely surrounds the block and is radially and axially smaller than the block to compress the block creating compressive stresses therein also contributing to maintain a firm and tight socket for the ball.

The bearing block of the joints of this invention is thus both stretched over the ball and compressed in the socket with the stretching forces coacting with the compression forces to maintain a tight fitting socket for the ball even as wear develops. The free preform shape of the block is very close to its prestressed shape so that substantial flow of the plastic is not involved at any local areas and the stresses are substantially uniform around the ball end. All of this is done without the aid of additional take up components such as springs and the like.

Specifically the bearing block for the joints of this invention is composed of a high density ethylene copolymer plastic which has a combination of properties allowing a higher degree of cold flow within its elastic limit. Linear ethylene copolymers have straight chain or substantially unbranched polyethylene molecules closely packed together because of the absence of branches. This provides a very dense structure. In the high density linear ethylene copolymer materials there is less amorphous material than in the low density ethylene copolymers and the lack of this amorphous material content is useful in dampening out vibrations permitted by more elastic materials.

I have discovered that the successful fatigue life of a bearing material for purposes of dynamic load carrying capacity and dynamic damping can be expressed by a factor:

$$K = \frac{\dfrac{10^3}{12 \text{ in.}^2} \text{ Impact strength, ft. pounds/in.}}{\mu \quad \text{Flexural modulus, pounds/in.}^2}$$

Impact strength determined according to ASTM D–256–56
Flexural modulus to ASTM D–790
$\mu$ = Dry coefficient of friction $\dfrac{10^3}{12 \text{ in.}^2}$ = An empirical constant I have discovered further that materials with K factor values within a range of .121 to .303 provide an exceptionally good combination of load carrying and dynamic damping characteristics, when designed and assembled into steering and suspension joints of the construction described in this application.

High-density ethylene copolymers and high-density polyethylene materials have been found to be quite suitable for the bearing blocks in the joints of this invention. High-density ethylene copolymers, manufactured and sold by Phillips Chemical Company under the trade name "Marlex," especially the resins designated 5002 and 5003, have been found to be sepecially useful. The range of physical properties of these resins are as listed below.

Density _____ gms./cc__ .950
Melt index _____ .2 to .3
Tensile strength _____ p.s.i__ 3800 to 4700
Impact strength _____ ft. lbs./in. notch__ 2 to 4
Flexural modulus _____ p.s.i__ 165,000
Hardness (Shore D) _____ 67

Another suitable ethylene copolymer material for the bearing blocks and the joints of this invention is "Alathon" manufactured by Du Pont. The high density "Alathons," such as No. 7622, are very useful. These materials have exceptional stiffness and resistance to environmental stress as well as high heat resistance and good molding characteristics.

Still another suitable ethylene copolymer is "Fortiflex" B–50–20R sold by Celanese Plastics Company.

It is then an object of this invention to provide joints and bearings with preformed preloaded bearing members effective to release stored energy to reclaim the original preformed shape and to take up wear and looseness developed during use.

Another object of the invention is to provide joint assemblies with premolded bearing blocks initially stretched around an inserted joint member and then compressed in a surrounding joint housing to store up residual force vectors which will maintain fixed centers for the joint components while accommodating free relative movement thereof.

Another object of the invention is to provide a ball joint with a high density non-metallic preformed bearing having sufficient elasticity to accommodate a change in its preformed shape but retaining elastic memory for reclaiming the preformed shape thereby providing wear take up capacity during use.

Another object of the invention is to provide a ball and socket joint having a preformed high density bearing block substantially completely enveloping the ball member and pre-loaded to create force vectors normal to the spherical ball surface for maintaining fixed tilting centers for the ball while preventing looseness from developing in the joints.

Another object of the invention is to provide a ball and socket joint with a ball enveloping bearing composed of high density linear polyethylene which is completely enveloped and compressed in a rigid housing.

A still further object of this invention is to provide a ball and socket steering linkage joint having a premolded high density linear polyethylene bearing block stretched over the ball end of the ball stud in substantially complete enveloping relation therewith and compressively loaded in an enveloping rigid casing.

Another object of the invention is to provide a permanently greased ball and socket joint having a high density linear ethylene copolymer premolded spherical bearing stretched over an oversized ball stud to deform the bearing and provide lubricant pockets therein accomplishing boundary layer lubrication throughout the complex rotary and oscillating movements of the ball member in the bearing.

Other and further objects of this invention will be apparent to those skilled in this art from the following description of the annexed sheet of drawings which, by way of a preferred embodiment only, illustrate one example of this invention.

On the drawings:

FIGURE 1 is a vertical cross sectional view, with parts in elevation, of a ball and socket joint according to this invention.

FIGURE 2 is a vertical cross sectional view of the preformed high density linear ethylene copolymer bearing block for the joint of this invention.

FIGURE 2A is a fragmental vertical cross sectional view similar to FIGURE 2 but showing an alternative bottom for the bearing block.

FIGURE 3 is a view illustrating the manner in which the ball stud is forced into the plastic bearing.

FIGURE 4 is a view showing the ball stud seated in the bearing and illustrating the manner in which the bearing is stretched by the stud.

FIGURE 5 is a view illustrating the manner in which the stud and bearing assembly is inserted into the joint socket.

FIGURE 6 is a view illustrating the manner in which the closure plate of the joint is secured in the socket to compress the bearing.

As shown on the drawings:

The reference numeral 10 of FIG. 1 designates generally a ball and socket joint tie rod end for automotive steering linkages. The joint 10 includes a metal housing 11, a metal ball stud 12, a high density linear polyethylene plastic bearing 13 and a closure plate 14.

The housing 11 has an annular socket forming end 15 and a laterally extending externally threaded stem 16 for insertion in a tie rod (not shown). The socket end has a tapered interior bore 17 converging from the bottom thereof at an included angle of about 7° to an inturned substantially flat shoulder 18 surrounding an opening 19. The shoulder 18 is in a plane substantially normal to the axis Ax of the socket 11. The bottom of the socket 15 is spun over the periphery of the closure plate 14 as shown at 20 to form a shoulder 21 opposing the shoulder 18 for retaining the plate in the socket.

The bearing 13 in its free premolded state, as shown in FIG. 2, has a tapered outer periphery 22 generally complementary with the bore 17 of the housing to fit in the bore in good mated contact therewith. The tapered periphery 22 converges from a dished bottom 23 to a substantially flat top 24. The bottom 23 conforms generally with the dished shape of the closure plate 14 and the top 24 conforms generally with the substantially radial or flat shoulder 18 of the housing 15.

The bottom 23 has a small central aperture 25 at the center thereof and the top 24 surrounds a larger aperture 26. A fragmental circular toroidal interior bearing wall 27 extends between the apertures 25 and 26. This bearing wall 27 is substantially completely toroidal being interrupted only at the poles by the apertures 25 and 26. The bearing wall 27 thus extends from the equator almost to the poles.

The bearing wall 27 is struck from a radius R centered from the periphery of a circle C having its center on the intersection of an axis Ax through the centers of the holes 25 and 26 and the equator E normal to the axis. The bearing wall 27 is thus toroidal and encompasses substantially a complete half torus (hemisphere) beneath the equator E and a substantial half torus (hemisphere) above the equator E.

The bottom 23 converges from the circumference of the aperture 25 to the large end of the tapered circumference 22 at a substantial angle A of less than 45°. This inclined bottom 23 conserves bearing material, make possible the use of housing ends 15 of less height and also provides loading stresses in directions toward the spherical interior 27 as will be more fully hereinafter described.

If desired the aperture 25 in the bottom 23 of the bearing 13 can be closed by a thin flexible bottom wall 25a spanning the otherwise apertured space as shown in FIGURE 2A on the bearing 13a. This closure seals off the interior of the bearing against contaminants and moisture entrance as well as lubricant leakage.

The stud 12 has a substantially full ball end 28 with a generally cylindrical stem 29 projecting therefrom. The ball end or head 28 is struck from a radius R' centered on the periphery of a C' which has its center on the axis Ax' through the axial center on the stem 29. This radius R' is larger than the radius R of the bearing wall 27 so that when the ball head 28 is seated in the bearing, the bearing is in stretched condition. The shank 29 of the stud has a straight cylindrical neck portion 30 of a diameter D which is substantially less than the diameter of the aperture 26 of the bearing and the aperture 19 of the housing 15 so that the stud may tilt through a predetermined angle without contacting the housing. The cylindrical shank portion 30 extends to a large end of a tapered portion 31 which converges to a reduced diameter threaded cylindrical end portion 32. The tapered portion 31 is adapted to be wedge fitted in the eye of steering linkage and the threaded end 32 is adapted to receive a nut for drawing the tapered portion into wedge fit with the eye.

The stud 12 is assembled in the bearing 13 as illustrated in FIG. 3. As there shown the aperture 26 receives the ball head 28 with the ball stretching and deforming the upper portion of the bearing causing the portion F of the bearing above the equator E to flare outwardly to accommodate the ball. The leading end of the ball can be coated with grease as illustrated at 33 to facilitate insertion but it is important to have several daubs of grease around the interior periphery of the bearing at the equator area as shown at 33a this insures extrusion of grease outwardly in both directions from the equator to fill the cavity and develop a full lubricant film between the ball and bearing.

After the equator of the ball passes through the aperture 26 the inherent resiliency of the bearing 13 will cause the deformed portion F to snap back to its free preform as much as the inserted ball end 28 will permit. However, since the radius R' of the ball end 28 is greater than the radius R of the toroidal interior of the bearing 13, the bearing 13 is stretched from its free preformed shape even when the ball end 28 is fully inserted in the bearing as illustrated in FIG. 4. As there shown, the top portion F' of the bearing is still deformed outwardly although not to the extent of the deformation F shown in FIG. 3 and the lower portion of the bearing is also expanded to increase the taper of the periphery 22 below the equator of the bearing. Thus the tapered periphery 22 of the bearing is outwardly deformed into generally cylindrical form above the equator and into a more pronounced taper below the equator. Further, the rim 34 between the periphery 22 and the top 24 will be of larger diameter than the free state rim. In addition the angle of inclination A the bottom of the bearing 13 will be increased as illustrated at A'. The bearing 13 is in effect rocked outwardly both below and above the equator E thus deforming the toroidal interior 27 into bowed portions 27a and 27b which are not true spheres and which converge approximately at 27c at the equator E of the bearing. This bowing action forms annular pockets 35 and 36 on opposite sides of the equator or merge zone 27c. The bottom pocket is closed off at the aperture 25 while the top pocket is closed off at the aperture 26. Lubricant is trapped in these pockets and as will be more fully hereinafter explained provides boundary layer lubrication for the full life of a joint throughout all complex rotary and oscillating movements of the ball in the bearing.

With the bearing 13 stretched over the ball head 28 and the lubricant trapped in the pockets 35 and 36, the bearing and stud assembly is next inserted in the socket or housing 15 as shown in FIG. 5. As there shown the expanded rim portion 34 bottoms on the tapered bore 17 of the socket 15 in advance of the shoulder 18 thus stopping free fit insertion of the assembly in the housing at a level substantially spaced from the shoulder 18. In this condition a tapered wall 22 of the bearing 13 is spaced from the bore 17 except at the expanded portion adjacent the rim 34.

To complete the assembly, as shown in FIG. 6, the closure plate 14 is placed over the bearing end 23 and conforms generally in shape with the dished shape of this end. A load L is then placed on the closure plate 14 to force the bearing 23 completely into the socket against the shoulder 18. This loading action compresses the bearing both axially and radially inward causing it to tend to reclaim its free state preform shape from its stretched condition caused by the larger ball head 28, but since the ball remains in the bearing this condition cannot be obtained and some compression of the bearing material will occur. Since the bearing is only exposed at the narrow walls or rims 25a and 26a of the small and large openings 25 and 26 the enveloping housing 15 and closure 14 does not substantially reshape the preform. Innterparticle flow incident to deformation of plastics is minimized and high stressed local areas alternating with low stressed areas are avoided.

When the bearing is fully bottomed on the shoulder 18 a spinning tool 37 acts on the open end of the housing 15 to deform the portion 20 and form the shoulder 21 overlying the periphery of the plate 14.

As illustrated in FIG. 6 the stressed bearing 13 exerts force vectors designated by the arrows substantially normal to the toroidal ball end 28 (directed toward the ball center C') and completely eveloping the major portion of the ball. These force vectors tend to conform the interior socket wall 27 of the bearing into full seating engagement with the ball end but the lubricant trapped in the pockets 35 and 36 is effective to prevent full conformity and as a result boundary line lubrication is always insured with the lubricant sealed in the pockets by the tight seats at the apertured ends of the pockets.

Since the linear polyethylene or ethylene co-polymer does have some elastic properties, stored energy is maintained in the stressed bearing which will take up wear developed during use of the joint. It will be especially noted that no wear take up springs are needed and the closure plate 14 is seated directly on the bearing. This elimination of heretofore required wear take up means greatly reduces the required overall height of the assembly, saves material and decreases weight.

Since the angle of inclination A of the end 23 of the free state bearing conforms generally with the angle of inclination of the dished closure plate 14 and since the oversize ball end 28 increases this angle A' as shown in FIG. 4, the axial loading of the bearing 13 in the tapered socket 15 will have radially inwardly directed components all around the bearing insuring force vectors directed toward the center C' of the ball end 28 tending to reclaim the free preform shape. This creates a uniform squeezing of the bearing and prevents substantial deformation and uneven stress loading and local flow. Because the ball end is substantially completely enveloped these stresses are all around the ball end and high unit stress loading is avoided.

By way of illustration it may be pointed out that the aperture 25 is only of the order of .39 inch while the aperture 26 is of the order of .88 inch in diameter. Likewise the diameter of the ball end 28 is of the order of 1.03 inches while the free state interior diameter of the bearing wall 27 of the bearing is of the order of 1.04 inches. The loading force for prestressing the bearing in the socket is of the order of 2000 lbs.

The high density ethylene copolymer or linear polyethylene bearing 13 substantially completely encapsulated in a rigid housing 15 and prestressed uniformly and completely around the ball end 28 makes possible the production of springless wear take up ball joints without introducing "soft" or "mushy" transmission of loads through the joint. The bearing material, although somewhat elastic and compressible, is sufficiently firm and rigid itself, and is surrounded by a very rigid casing to hold the joint components on their original centers under load. At the same time the high density copolymer material is sufficiently elastic so that it can be molded in one piece in a shape to substantially completely envelop the ball end of the ball stud enabling the ball end to be snapped into the bearing. The high density linear polyethylene bearing material, by virtue of its straight chain or unbranched molecule, will quickly dampen out vibrations, absorb stresses and yet maintain sufficient rigidity to hold the components in proper relation.

Although various modifications might be suggested by those versed in the art, it should be understood that I wish to embody within the scope of the patent granted hereon all such embodiments as reasonably and properly come within the scope of my contribution to the art.

I claim as my invention:

1. A bearing for ball and socket joints which comprises an annular one-piece molded plastic block having axially aligned apertures in opposite ends and a substantially complete circular toroidal bearing wall extending between and joining said ends, one of said apertures being small to provide a substantially full hemitoroidal bearing area below the equator of the bearing wall normal to the axis of the apertures and the larger aperture being substantially smaller than said equator to provide a substantial hemitoroidal bearing area above said equator, and said block being so proportioned in thickness and length and having the radius of the bearing wall so chosen relative to that of the ball of the joint that it is stretched upon receiving the ball of the joint through said large aperture and compressed upon insertion in the socket of the joint to have loaded zones of engagement with the ball adjacent each aperture and at said equator with annular pockets between said zones adapted to trap lubricant.

2. The bearing of claim 1 wherein the plastic block is composed of a high density linear ethylene copolymer.

3. A ball and socket joint which comprises a ball stud having a substantially full ball end and a generally cylindrical stem projecting therefrom, a rigid socket housing having an aperture at one end for freely receiving the stem of the stud therethrough and a larger aperture at the other end, a molded plastic bearing block stretched over the ball end of the stud and compressed in the socket, said block having an inclined bottom wall with a free state angle of inclination increased by the ball end of the ball stud, said inclined bottom of the block receiving a dished closure plate in the large open end of the socket, said closure plate having an angle of inclination conforming with the free state angle of inclination of the bottom of the block, and said socket loading said closure plate against said bearing block to develop with the socket radially inward force components all around the block producing force vectors directed to the center of the ball end and tending to reclaim the free state shape of the block.

4. The ball and socket joint of claim 3 wherein the molded plastic bearing block is composed of a high density linear ethylene copolymer.

5. A ball and socket joint which comprises a metal ball stud having a substantially complete ball end and a generally cylindrical shank extending therefrom, a preformed high density linear ethylene copolymer bearing stretched over said ball end in substantially complete enveloping relation therewith, said bearing having axially aligned openings through opposite ends thereof, one of said openings being relatively small, the opposite opening being sufficiently large to receive the shank freely therethrough for accommodating tilting of the stud in the bearing, said bearing having a fragmental circular toroidal inner bearing wall extending continuously between said openings and having a free state radius smaller than the radius of said ball end of the stud, said bearing being deformed radially outward at opposite ends thereof by said ball end of the stud of have high pressure loaded engagement with the ball end around each opening and around an equator substantially midway between said openings, an open ended housing member surrounding said bearing having a small diameter opening at one end thereof receiving the stud shank freely therethrough and a large opening at the opposite end thereof together with a bore therebetween sized to radially load said bearing, a closure plate fitting freely in the large open end of the housing and bottomed on said bearing to completely cover the bearing, said housing having a peripheral portion overlying the closure plate and exerting an axial force thereon to axially compress the bearing between the closure plate and socket, said high density linear ethylene copolymer material of the bearing acting under said axial and radial compression load thereon similar to a hydraulic fluid to provide force vectors generally normal to the surface of the ball end and effective to release energy for taking up wear developed during use of the joint, and lubricant trapped between the ball end and bearing in annular zones on opposite sides of the equator of the bearing to provide boundary line lubrication throughout rotary and oscillating movements of the stud in the bearing.

6. A ball and socket joint which comprises an open end socket having a tapered side wall converging from a large open end to a small opposite open end, a ball stud having a substantially complete ball end in said socket and a generally cylindrical shank extending from said ball end through the small open end of the socket, a high density linear ethylene copolymer ball seat engaging said ball end in said socket in substantially complete enveloping relation on said ball end, said seat having an internal fragmental toroidal surface with a radius less than the radius of the ball end and a tapered outer periphery seated in the socket, said ball end deforming said seat radially outward on opposite sides of the equator of the seat and said seat having annular line contact with said ball end around the equator and on opposite sides thereof, lubricant trapped in annular pockets betwen said line contact zones, a closure plate bottomed on said seat in said socket, said socket having a portion overlying said closure plate in thrusting relation to cause the plate to exert an axial loading force compressibly loading said seat in the socket and the tapered side wall of the seat coacting with the socket wall under said axial load to radially load the seat around said ball end whereby said high density linear ethylene copolymer material of the seat will create force vectors generally normal to the ball end and effective for taking up wear during use of the joint.

7. A ball and socket joint which comprises a ball stud having a substantially complete ball end and a generally cylindrical shank extending from said ball end, a molded plastic bearing block substantially completely enveloping said ball end, said block having an internal fragmental toroidal surface with a radius less than the radius of the ball end and a tapered outer periphery, a socket having a tapered bore enveloping said tapered periphery of the plastic bearing block and dimensioned to exert a compressive loading force completely therearound, said block being deformed radially outward at opposite ends thereof by said ball end of the stud to have high pressure loaded annular line contact in engagement with the ball end around the equator and on opposite sides of the equator providing annular pockets between said annular line contact portions, lubricant trapped in said annular pockets, a closure plate in the large end of the bore of the socket bottomed on said block, and means on said socket overlying and loading the closure plate against the block to develop with the socket force vectors generally directed to the center of the ball end tending to reclaim the free state shape of the block.

References Cited

UNITED STATES PATENTS

| | | | |
|---|---|---|---|
| 2,424,431 | 7/1947 | Booth | 287—85 |
| 2,995,381 | 8/1961 | Melton et al. | |
| 3,147,537 | 9/1964 | Fadow | 287—90 |
| 3,197,842 | 8/1965 | Parker | 287—90 |
| 3,249,375 | 5/1966 | Herbenar | 287—90 |

FOREIGN PATENTS

| | | |
|---|---|---|
| 232,208 | 1/1961 | Australia. |

CARL W. TOMLIN, *Primary Examiner.*

ANDREW KUNDRAT, *Assistant Examiner.*